United States Patent
Lin et al.

(10) Patent No.: US 9,201,483 B2
(45) Date of Patent: Dec. 1, 2015

(54) IMAGE PROCESSING UNIT, IMAGE PROCESSING APPARATUS AND IMAGE DISPLAY SYSTEM

(71) Applicant: Novatek Microelectronics Corp., Hsinchu (TW)

(72) Inventors: Wen-Chi Lin, Yilan County (TW);
Kuo-Chi Chen, Hsinchu County (TW);
Sih-Ting Wang, Kaohsiung (TW);
Wen-Hsuan Lin, New Taipei (TW);
Chung-Wen Wu, Yilan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 99 days.

(21) Appl. No.: 13/909,084

(22) Filed: Jun. 4, 2013

(65) Prior Publication Data

US 2014/0198089 A1 Jul. 17, 2014

Related U.S. Application Data

(60) Provisional application No. 61/753,372, filed on Jan. 16, 2013.

(30) Foreign Application Priority Data

Apr. 2, 2013 (TW) .............................. 102111912 A

(51) Int. Cl.
*G06F 3/038* (2013.01)
*G06F 1/32* (2006.01)
*G09G 3/36* (2006.01)

(52) U.S. Cl.
CPC ............... *G06F 1/32* (2013.01); *G06F 1/3234* (2013.01); *G09G 3/3611* (2013.01); *G09G 2330/022* (2013.01); *Y02B 60/32* (2013.01)

(58) Field of Classification Search
CPC . G09G 3/3611; G09G 2330/022; G09G 3/36; G09G 2330/021; G09G 3/3696; G06F 1/3234; G06F 1/32; Y02B 60/32

USPC .......................................................... 345/212
See application file for complete search history.

(56) References Cited

U.S. PATENT DOCUMENTS 4,748,444 A * 5/1988 Arai ................................ 345/99
8,730,146 B2 * 5/2014 Lee ................................ 345/101
(Continued)

FOREIGN PATENT DOCUMENTS

| CN | 1421842 | 6/2003 |
| CN | 1854987 | 11/2006 |

(Continued)

OTHER PUBLICATIONS

"Office Action of Taiwan Counterpart Application", issued on Nov. 17, 2014, p. 1-p. 10, in which the listed references were cited.
"Office Action of China Counterpart Application", issued on Sep. 25, 2015, p. 1-p. 11.

*Primary Examiner* — Towfiq Elahi
(74) *Attorney, Agent, or Firm* — Jianq Chyun IP Office

(57) ABSTRACT

An image processing unit including an always on circuit block and a non-always on circuit block is provided. When operating under a first operation mode, the non-always on circuit block receives a bias voltage from a power supply unit, so as to perform an image processing operation on an image input signal. When operating under a second operation mode, the non-always on circuit block stops receiving the bias voltage from the power supply unit, so as to stop the image processing operation, and at least a microcontroller of the non-always on circuit block is powered down. One of the always on circuit block and the non-always on circuit block controls the power supply unit to stop supplying the bias voltage to the non-always on circuit block according an event trigger signal, such that the non-always on circuit block enters the second operation mode from the first operation mode.

17 Claims, 4 Drawing Sheets

(56) References Cited

U.S. PATENT DOCUMENTS

| | | |
|---|---|---|
| 2006/0132474 A1* | 6/2006 | Lam .............................. 345/204 |
| 2007/0182681 A1 | 8/2007 | Kim |
| 2012/0235983 A1* | 9/2012 | Sakamoto et al. ............ 345/212 |
| 2012/0293481 A1* | 11/2012 | Chaji ............................ 345/212 |
| 2013/0135282 A1* | 5/2013 | Jeon .............................. 345/212 |

FOREIGN PATENT DOCUMENTS

| | | |
|---|---|---|
| TW | 200518013 | 6/2005 |
| TW | 200623862 | 7/2006 |
| TW | 201012216 | 3/2010 |
| TW | 201037969 | 10/2010 |

\* cited by examiner

IMAGE PROCESSING UNIT, IMAGE PROCESSING APPARATUS AND IMAGE DISPLAY SYSTEM

CROSS-REFERENCE TO RELATED APPLICATION

This application claims the priority benefits of U.S. provisional application Ser. No. 61/753,372, filed on Jan. 16, 2013, and Taiwan application serial no. 102111912, filed on Apr. 2, 2013. The entirety of each of the above-mentioned patent applications is hereby incorporated by reference herein and made a part of this specification.

BACKGROUND

1. Technical Field

The disclosure relates to an image processing unit, an image processing apparatus and an image display system. Particularly, the disclosure relates to an image processing unit capable of providing lower system consumption in a power down mode, and an image processing apparatus and an image display system using the same.

2. Related Art

Along with increasing demand of displays, the industries are fully engaged in development of the related displays. Liquid crystal display (LCD) has become a main stream in the market due to its superior characteristics of high quality, good space utilization efficiency, lower power consumption, no radiation, etc. In recent years, due to the rise of environmental protection concept, the power-saving characteristic of the LCD becomes more important. Based on applications of the LCD, operation modes thereof mainly include an active mode and a power down mode. To achieve the power-saving effect, when the LCD is operated in the power down mode, demand on power consumption of the LCD is more stringent. In the conventional technique, even if a power module or an adaptor of the LCD is not considered, the LCD still has certain power consumption. Therefore, it is important to design an image display system to achieve lower power consumption.

SUMMARY

The disclosure is directed to an image processing unit, which is capable of providing lower system power consumption in a specific operation mode.

The disclosure provides an image processing apparatus including the aforementioned image processing unit, which is capable of providing lower system power consumption in a specific operation mode.

The disclosure provides an image display system including the aforementioned image processing apparatus, which is capable of providing lower system power consumption in a specific operation mode.

An exemplary embodiment of the disclosure provides an image processing unit including an always on circuit block and a non-always on circuit block. The always on circuit block is configured to receive a first bias voltage from a power supply unit. The non-always on circuit block includes a microcontroller (MCU) of the image processing unit. When the non-always on circuit block operates under a first operation mode, the non-always on circuit block receives a second bias voltage from the power supply unit, so as to perform an image processing operation on an image input signal. When the non-always on circuit block operates under a second operation mode, the non-always on circuit block stops receiving the second bias voltage from the power supply unit, so as to stop the image processing operation, and at least the microcontroller of the non-always on circuit block is powered down. One of the always on circuit block and the non-always on circuit block controls the power supply unit to stop supplying the second bias voltage to the non-always on circuit block according a first event trigger signal, such that the non-always on circuit block enters the second operation mode from the first operation mode.

In an embodiment of the disclosure, the always on circuit block controls the power supply unit to start supplying the second bias voltage to the non-always on circuit block according a second event trigger signal, such that the non-always on circuit block enters the first operation mode from the second operation mode.

In an embodiment of the disclosure, the always on circuit block controls the power supply unit to stop supplying the second bias voltage to the non-always on circuit block according the first event trigger signal, such that the non-always on circuit block enters the second operation mode from the first operation mode.

In an embodiment of the disclosure, the non-always on circuit block controls the power supply unit to stop supplying the second bias voltage to the non-always on circuit block according the first event trigger signal, such that the non-always on circuit block enters the second operation mode from the first operation mode.

In an embodiment of the disclosure, the always on circuit block outputs an operation stop signal to the non-always on circuit block according to the first event trigger signal. The non-always on circuit block outputs a power down signal to the always on circuit block according to the operation stop signal. The always on circuit block controls the power supply unit to stop supplying the second bias voltage to the non-always on circuit block according to the power down signal, such that the non-always on circuit block enters the second operation mode from the first operation mode.

In an embodiment of the disclosure, the microcontroller in the non-always on circuit block is configured to receive the operation stop signal.

In an embodiment of the disclosure, the always on circuit block outputs a power down signal to the power supply unit according to the first event trigger signal. The power supply unit stops supplying the second bias voltage to the non-always on circuit block according to the power down signal, such that the non-always on circuit block enters the second operation mode from the first operation mode.

In an embodiment of the disclosure, the non-always on circuit block further includes an input interface of the image processing unit.

An exemplary embodiment of the disclosure provides an image processing apparatus configured to drive a display panel. The image processing apparatus includes a power supply unit and the aforementioned image processing unit. The power supply unit is configured to provide a first bias voltage and a second bias voltage. The image processing unit is coupled to the power supply unit.

In an embodiment of the disclosure, the power supply unit includes a first power supply block and a second power supply block respectively providing the first bias voltage and the second bias voltage.

In an embodiment of the disclosure, the first power supply block is configured to receive a direct current (DC) voltage, and generates the first bias voltage according to the DC voltage. The second power supply block is configured to receive the first bias voltage, and generates the second bias voltage according to the first bias voltage.

In an embodiment of the disclosure, the first bias voltage is smaller than the DC voltage, and the second bias voltage is smaller than the first bias voltage.

In an embodiment of the disclosure, the first power supply block is configured to receive a DC voltage, and generates a third bias voltage according to the DC voltage. The second power supply block is configured to receive the third bias voltage, and generates the second bias voltage according to the third bias voltage. The power supply unit further includes a voltage dividing unit, which is configured to divide the third bias voltage to generate the first bias voltage.

In an embodiment of the disclosure, the image processing apparatus further includes a power conversion circuit. The power conversion circuit is configured to receive an alternating current (AC) voltage, and converts the AC voltage into the DC voltage.

An exemplary embodiment of the disclosure provides an image display system including the aforementioned image processing apparatus and a display panel. The display panel is driven by the image processing apparatus to display an image.

An exemplary embodiment of the disclosure provides an image processing unit including an always on circuit block and a non-always on circuit block. The always on circuit block is configured to receive a first bias voltage from a power supply unit. When the non-always on circuit block operates under a first operation mode, the non-always on circuit block receives a second bias voltage from the power supply unit. When the non-always on circuit block operates under a second operation mode, the non-always on circuit block stops receiving the second bias voltage from the power supply unit. The always on circuit block outputs an operation stop signal to the non-always on circuit block according to a first event trigger signal. The non-always on circuit block outputs a power down signal to the always on circuit block according to the operation stop signal. The always on circuit block controls the power supply unit to stop supplying the second bias voltage to the non-always on circuit block according to the power down signal, such that the non-always on circuit block enters the second operation mode from the first operation mode.

In an embodiment of the disclosure, the non-always on circuit block includes a microcontroller of the image processing unit. When the non-always on circuit block operates under the second operation mode, at least the microcontroller in the non-always on circuit block is powered down.

In an embodiment of the disclosure, when the non-always on circuit block operates under the first operation mode, the non-always on circuit block performs an image processing operation on an image input signal. When the non-always on circuit block operates under the second operation mode, the non-always on circuit block stops the image processing operation.

In an embodiment of the disclosure, the always on circuit block controls the power supply unit to start supplying the second bias voltage to the non-always on circuit block according to a second event trigger signal, such that the non-always on circuit block enters the first operation mode from the second operation mode.

An exemplary embodiment of the disclosure provides an image processing unit including an always on circuit block and a non-always on circuit block. The always on circuit block is configured to receive a first bias voltage from a power supply unit. When the non-always on circuit block operates under a first operation mode, the non-always on circuit block receives a second bias voltage from the power supply unit. When the non-always on circuit block operates under a second operation mode, the non-always on circuit block stops receiving the second bias voltage from the power supply unit. The always on circuit block outputs a power down signal to the power supply unit according to a first event trigger signal. The power supply unit stops supplying the second bias voltage to the non-always on circuit block according to the power down signal, such that the non-always on circuit block enters the second operation mode from the first operation mode.

In an embodiment of the disclosure, the non-always on circuit block includes a microcontroller of the image processing unit. When the non-always on circuit block operates under the second operation mode, at least the microcontroller in the non-always on circuit block is powered down.

In an embodiment of the disclosure, when the non-always on circuit block operates under the first operation mode, the non-always on circuit block performs an image processing operation on an image input signal. When the non-always on circuit block operates under the second operation mode, the non-always on circuit block stops the image processing operation.

In an embodiment of the disclosure, the always on circuit block controls the power supply unit to start supplying the second bias voltage to the non-always on circuit block according to a second event trigger signal, such that the non-always on circuit block enters the first operation mode from the second operation mode.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
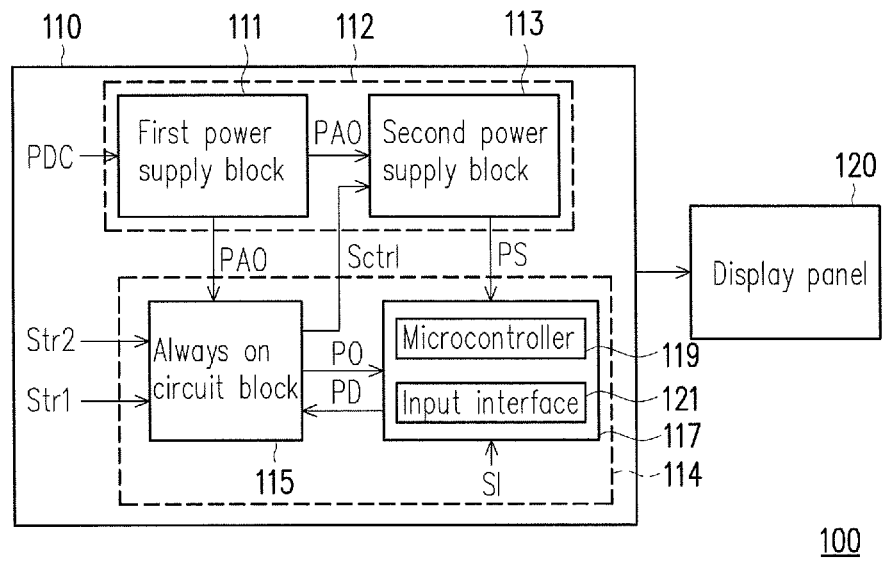
FIG. 1 is a schematic diagram of an image display system according to an embodiment of the disclosure.

A plurality of embodiments are provided below to describe the disclosure, though the disclosure is not limited to the provided embodiments, and the embodiments can be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or certain connection means. Moreover, a term "signal" refers to at least a current, a voltage, a charge, a temperature, data or any other one or a plurality of signals.

In related applications of the disclosure, an image display system generally includes a power conversion circuit, an image processing apparatus and a display panel. The power conversion circuit is, for example, a power supply module, and is configured to convert an alternating current (AC) voltage into a direct current (DC) voltage, and provides the DC voltage to the image processing apparatus to serve as an operating voltage in image processing. The image processing apparatus receives image data, and processes the same for transmitting to the display panel, so as to display an image. Generally, the image processing apparatus includes a power supply unit and an image processing unit, where the image processing unit is, for example, implemented as a video scaler chip, though the disclosure is not limited thereto. Moreover, the image processing apparatus is generally implemented as a system board. In different embodiments, the power conversion circuit and the image processing apparatus can be separately set or set in combination. In other applications of the disclosure, the power conversion circuit can be an adaptor.

Moreover, in order to achieve a power-saving effect, the internal of the image processing apparatus is designed with some power-saving structures. According to different types of power supplies used for biasing circuit blocks, the image processing unit approximately includes an analog circuit block and a digital circuit block. The analog circuit block perform circuit operation under a bias of an analog power supply, and the digital circuit performs circuit operation under a bias of a digital power supply. In a related technique, in order to achieve the power-saving effect, a clock generator in internal of the digital circuit block is selectively turned on/off. However, even if the clock generator is turned off, the digital power supply used for biasing the digital circuit block still supplies power to the digital circuit block, so that the power-saving effect is limited. In order to resolve such problem, another related technique is to further divide the digital circuit block into a first circuit block and a second circuit block. In order to achieve the power-saving effect, a power supply path of the second circuit block is selectively cut off. However, since the first circuit block includes circuit devices such as a microprocessor, an input processor, a general-purpose input/output (GPIO) interface, a clock generator, etc., even if the power supply path of the second circuit block is cut off, the first circuit block still performs various circuit operations, so that the power-saving effect is also limited.

In the present disclosure, based on whether the circuit block is powered down in a low power consumption mode, the image processing unit approximately includes an always on circuit block and a non-always on circuit block. One of the always on circuit block and the non-always on circuit block controls the power supply unit to stop supplying a bias voltage to the non-always on circuit block according an event trigger signal, such that the non-always on circuit block enters a second operation mode with lower power consumption from a first operation mode. In the second operation mode with lower power consumption, at least a microcontroller is arranged to be power down, so as to achieve a certain power-saving effect. Moreover, the always on circuit block can further control the power supply unit to start supplying the bias voltage to the non-always on circuit block according to another event trigger signal, such that the non-always on circuit block enters the first operation mode from the second operation mode with lower power consumption. Some embodiments are provided below to describe detailed operations of internal circuits of the image processing unit when the image processing unit operates in different modes.

FIG. 1 is a schematic diagram of an image display system according to an embodiment of the disclosure. Referring to FIG. 1, the image display system 100 of the present embodiment includes an image processing apparatus 110 and a display panel 120. The display panel 120 is driven by the image processing apparatus 110 to display images. The image processing apparatus 110 includes a power supply unit 112 and an image processing unit 114. The image processing unit 114 is coupled to the power supply unit 112. The power supply unit 112 is configured to provide a first bias voltage PAO and a second bias voltage PS to the image processing unit 114. In the present embodiment, the image processing unit 114 is, for example, a video scaler chip configured in internal of the image processing apparatus 110, and the video scaler chip is, for example, used for scaling images and converting an update rate of the images. A size and a display position of an image can be adjusted by controlling a magnification rate of the video scaler chip and an initial display position and an initial size of the image. Moreover, the image processing unit 114 can perform conversion processing on the image data between an input interface and an output interface, i.e. after receiving and processing the image data of the input interface (for example, one of or a plurality of D-SUB, DVI, HDMI, DP, MHL), the image processing unit 114 converts the same into the image data of the output interface (for example, LVDS) for transmitting to the post display panel. It should be noticed that in the present disclosure, the image processing unit 114 is not limited to be the video scaler chip.

In detail, the image processing unit 114 includes an always on circuit block 115 and a non-always on circuit block 117. Preferably, the always on circuit block 115 at least includes an event detection circuit, and may further include a clock generator, for example, a resistance-capacitance oscillator (RC oscillator). Moreover, the non-always on circuit block 117 at least includes a microprocessor, and may further include at least one of an input processor, a general-purpose input/output (GPIO) interface, a clock generator, a synchronization processor, etc.

The power supply unit 112 includes a first power supply block 111 and a second power supply block 113 respectively providing the first bias voltage PAO and the second bias voltage PS to the always on circuit block 115 and the non-always on circuit block 117. In an embodiment, the first power supply block 111 can receive a DC voltage PDC and generates the first bias voltage PAO according to the DC voltage PDC. For example, the DC voltage PDC is 12V, and the first bion voltage PAO is 5V, though the disclosure is not limited thereto. In some implementations of the present embodiment, the first power supply block 111 includes a buck circuit structure, which is used for down-converting the DC voltage PDC of 12V to the first bias voltage PAO of 5V. In the same of a different embodiment, the second power supply block 113 may receive the first bias voltage PAO and generate the second bias voltage PS according to the first bias voltage PAO. For example, a voltage value of the second bias voltage PS is, for example, 1.2V, 1.8V, 2.5V or 3.3V, and the magnitude thereof is determined according to an actual design requirement, which is not limited by the disclosure. In some implementations of the present embodiment, the second power supply block 113 includes another buck circuit structure used for down-converting the first bias voltage PAO of 5V to the second bias voltage PS. In other words, the first bias voltage PAO is designed to be smaller than the DC voltage PDC, and the second bias voltage PS is smaller than the first bias voltage PAO.

In the present embodiment, the always on circuit block 115 receives the first bias voltage PAO from the first power supply block 111. The non-always on circuit block 117 at least includes a microcontroller 119 of the image processing unit 114, and may further include an input interface 121. The interface 121 is configured to receive an image input signal SI, and the microcontroller 119 is configured to perform an image processing operation on the image input signal SI. When the non-always on circuit block 117 operates under a first operation mode, for example, an active mode, the non-always on circuit block 117 receives the second bias voltage PS from the second power supply block 113 for performing the image processing operation on the image input signal SI. Moreover, in the first operation mode, the image processing unit 114 is in a normal operation state, and each circuit block in internal of the non-always on circuit block 117 performs the corresponding image processing operation on the received image input signal SI. It should be noticed that the first operation mode of the disclosure includes but is not limited to the active mode.

On the other hand, when the non-always on circuit block 117 operates under a second operation mode, for example, a power down mode, the non-always on circuit block 117 stops receiving the second bias voltage PS from the second power supply block 113, and stops performing the image processing operation on the image input signal SI. In the second operation mode, the image processing unit 114 is in a state of low power consumption. Therefore, in order to decrease the power consumption of the image processing unit 114, at least the microcontroller 119 in the non-always on circuit block 117 is arranged to be powered down. Preferably, in the second operation mode, at least one of an input processor, a general-purpose input/output (GPIO) interface, a clock generator, a synchronization processor, etc. in the non-always on circuit block 117 can be simultaneously powered down. It should be noticed that the second operation mode of the disclosure includes but is not limited to the power down mode.

In the present embodiment, the always-on circuit block 115 controls the second power supply block 113 to stop supplying the second bias voltage PS to the non-always on circuit block 117 according a first event trigger signal Str1, such that the non-always on circuit block 117 enters the second operation mode from the first operation mode. For example, in the present embodiment, the always on circuit block 115, for example, outputs an operation stop signal PO to the microcontroller 119 of the non-always on circuit block 117 according to the first event trigger signal Str1. Then, the non-always on circuit block 117 transmits back a power down signal PD to the always on circuit block 115 according to the operation stop signal PO. Thereafter, the always on circuit block 115 outputs a control signal Sctr1 to the second power supply block 113 according to the power down signal PD, and controls the second power supply block 113 to stop supplying the second bias voltage PS to the non-always on circuit block 117, such that the non-always on circuit block 117 enters the second operation mode from the first operation mode. In the present embodiment, the first event, for example, refers to that the image display system 100 is turned off. Therefore, the first event trigger signal Str1 may come from one of one to multiple power keys of the image display system 100, or come from a serial data line (SDA) of a display data channel (DDC), or come from a serial clock line (SCL) of the DDC.

Conversely, in the present embodiment, the always on circuit block 115 can also outputs the control signal Sctr1 to the second power supply block 113 according to a second event trigger signal Str2, and controls the second power supply block 113 to start supplying the second bias voltage PS to the non-always on circuit block 117, such that the non-always on circuit block 117 enters the first operation mode from the second operation mode. In the present embodiment, the second event, for example, refers to that the image display system 100 is turned on. Therefore, the second event trigger signal Str2 may come from one of one to multiple power keys of the image display system 100, or come from the SDA of the DDC, or come from the SCL of the DDC.

Moreover, in the present embodiment, regarding a possible implementation that the second power supply block 113 stops supplying the second bias voltage PS to the non-always on circuit block 117, the second power supply block 113 is powered down under control of the control signal Sctr1, and stops generating and supplying the second bias voltage PS to the non-always on circuit block 117, or under control of the control signal Sctr1, although the second power supply block 113 already generates the second bias voltage PS according to the first bias voltage PAO, the second power supply block 113 stops outputting the generated second bias voltage PS to the non-always on circuit block 117. In the implementation that the second power supply block 113 generates the second bias voltage PS but stops outputting the generated second bias voltage PS to the non-always on circuit block 117, the second power supply block 113 may include a power control block to control the operation that the second power supply block 113 stops outputting the generated second bias voltage PS.

Figure 2:
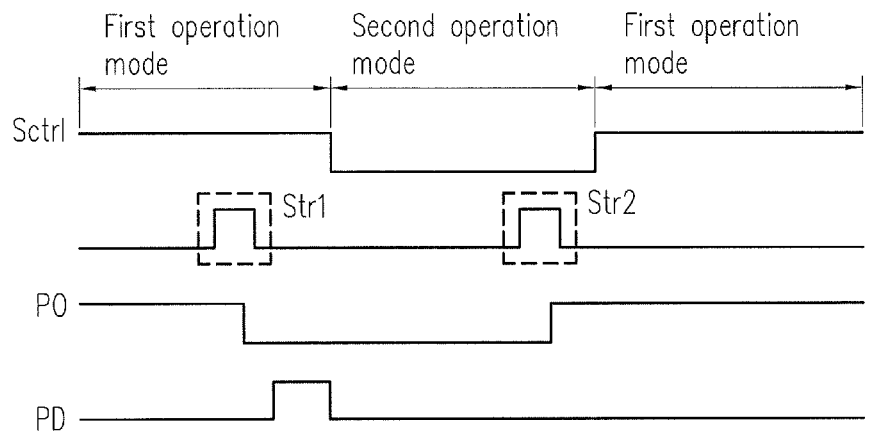
FIG. 2 is a schematic waveform diagram of a plurality of signals of the image display system of FIG. 1 according to an embodiment of the disclosure.

In detail, FIG. 2 is a schematic waveform diagram of a plurality of signals of the image display system of FIG. 1 according to an embodiment of the disclosure. Referring to FIG. 1 and FIG. 2, in the present embodiment, it is assumed that the image processing unit 114 is in the first operation mode in the beginning. In the first operation mode, when a first event is triggered, the always on circuit block 115 first receives the first event trigger signal Str1. Now, the always on circuit block 115 performs a filter or debounce processing on the first event trigger signal Str1. The first event trigger signal Str1 is, for example, a high-level pulse signal, though in other embodiments, the first event trigger signal Str1 can also be a low-level pulse signal. Then, after the always on circuit block 115 performs the filter or debounce processing on the first event trigger signal Str1 and confirms receiving the first event trigger signal Str1, the always on circuit block 115 outputs the operation stop signal PO of a low level to the microcontroller 119 in the non-always on circuit block 117. In the present embodiment, the always on circuit block 115 outputs the operation stop signal PO of the low level to the microcontroller 119, though in other embodiments, the always on circuit block 115 can also output the operation stop signal PO of a high level to the microcontroller 119. After receiving the operation stop signal PO of the low level, the non-always circuit block 117 generates the power down signal PD, and transmits the same back to the always on circuit block 115. The power down signal PD is, for example, a high level pulse signal, though in other embodiments, the power down signal PD can also be a low level pulse signal. Then, after receiving the power down signal PD of the high level, the always on circuit block 115 outputs the control signal Sctr1 of the low level to the second power supply block 113 to control the second power supply block 113 to stop supplying the second bias voltage PS to the non-always on circuit block 117. In the present embodiment, the always on circuit block 115 outputs the control signal Sctr1 of the low level to the second power supply block 113, though in other embodiments, the always on circuit block 115 can also output the control signal Sctr1 of the high level to the second power supply block 113. Now, the image processing unit 114 enters the second operation mode, and at least the microcontroller 119 in the non-always on circuit block 117 is powered down.

Then, in the second operation mode, when a second event is triggered, the always on circuit block 115 first receives the second event trigger signal Str2. The second event trigger signal Str2 is, for example, a high-level pulse signal, though in other embodiments, the second event trigger signal Str2 can also be a low-level pulse signal. After the always on circuit block 115 confirms receiving the second event trigger signal Str2, the always on circuit block 115 outputs the operation stop signal PO of the high level to the microcontroller 119, and outputs the control signal Sctr1 of the low level to the second power supply block 113, so as to control the power supply block 113 to start supplying the second bias voltage PS to the non-always on circuit block 117. Now, the non-always on circuit block 117 enters the first operation mode from the second operation mode, and starts to perform the image processing operation on the image input signal SI.

In the present embodiment, the always on circuit block 115 and the non-always on circuit block 117 communicate with each other through the operation stop signal PO and the power down signal PD, and the non-always on circuit block 117 records whether it is in a power on state or a power down state each time when the event is triggered, though the disclosure is not limited thereto. In another embodiment, no communication signal exists between the always on circuit block 115 and the non-always on circuit block 117. In other words, the operation stop signal PO and the power switch signal PD are not included there between.

Figure 3:
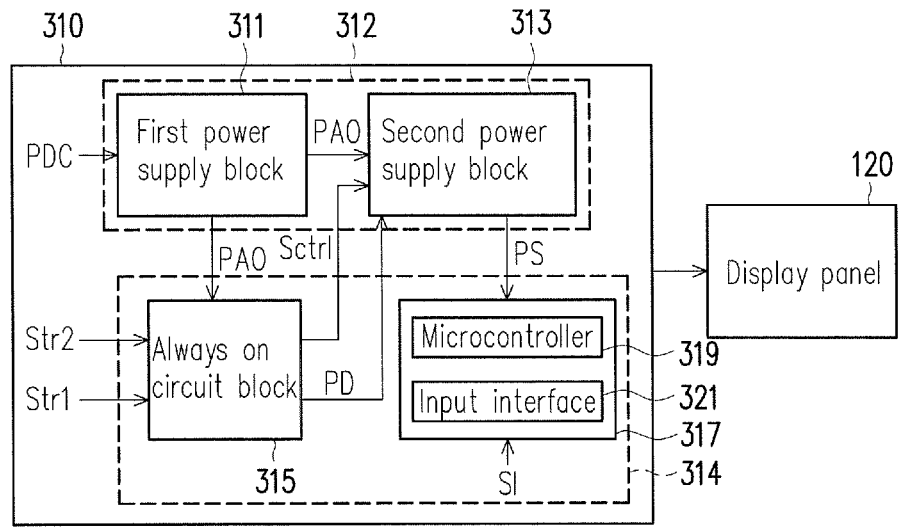
FIG. 3 is a schematic diagram of an image display system according to another embodiment of the disclosure.

FIG. 3 is a schematic diagram of an image display system according to another embodiment of the disclosure. Referring to FIG. 1 and FIG. 3, the image display system 300 of the present embodiment is similar to the image display system 100 of FIG. 1, and a difference there between is that the always on circuit block 315 of the present embodiment directly outputs the power down signal PD to the power supply block 313 according to the first event trigger signal Str1, so as to control the power supply block 313 to stop supplying the second bias voltage PS to the non-always on circuit block 317 according to the power down signal PD, such that the non-always on circuit block 317 enters the second operation mode from the first operation mode. In other words, the power supply block 313 can be controlled to stop supplying the second bias voltage PS to the non-always on circuit block 317 without communicating the always on circuit block 115 and the non-always on circuit block 117 through the operation stop signal PO and the power down signal PD.

Moreover, in the present embodiment, the same to the embodiment of FIG. 1, the always on circuit block 315 outputs the control signal Sctr1 to the second power supply block 313 according to the second event trigger signal Str2, so as to control the second power supply block 313 to start supplying the second bias voltage PS to the non-always on circuit block 317.

In the present embodiment, the second power supply block 313 is controlled by the always on circuit block 315 to start or stop supplying the second bias voltage PS to the non-always on circuit block 317, though the disclosure is not limited thereto. In another embodiment, the second power supply block 313 can be controlled by the non-always on circuit block 317 to stop supplying the second bias voltage PS to the non-always on circuit block 317.

Figure 4:
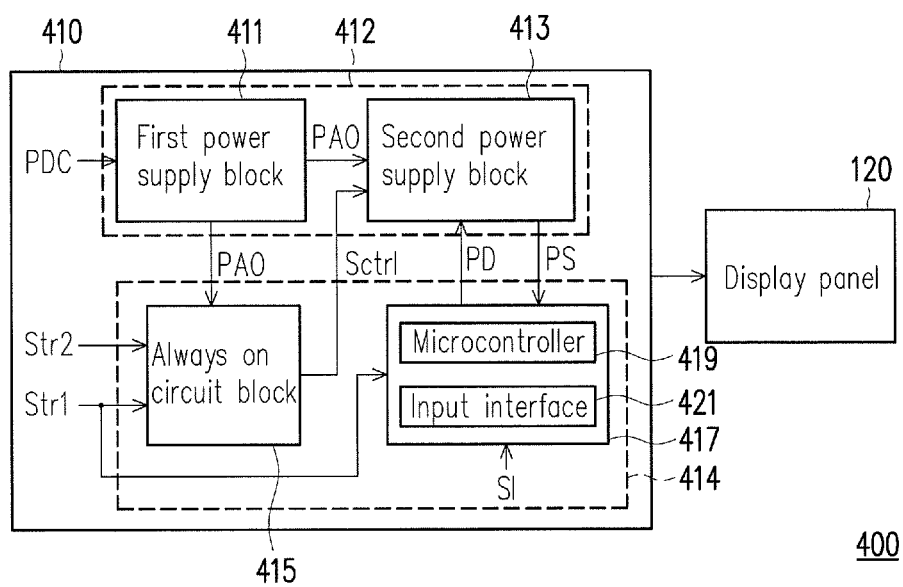
FIG. 4 is a schematic diagram of an image display system according to still another embodiment of the disclosure.

FIG. 4 is a schematic diagram of an image display system according to still another embodiment of the disclosure. Referring to FIG. 3 and FIG. 4, the image display system 400 of the present embodiment is similar to the image display system 300 of FIG. 3, and a difference there between is that the non-always on circuit block 417 of the present embodiment directly controls the power supply block 413 to stop supplying the second bias voltage PS to the non-always on circuit block 417 according to the first event trigger signal Str1, such that the non-always on circuit block 417 enters the second operation mode from the first operation mode.

In the present embodiment, after the non-always on circuit block 417 enters the second operation mode, the circuit block without operation therein is turned off to achieve a power down effect. Therefore, in the present embodiment, the operation of controlling the second power supply block 413 to start supplying the second bias voltage PS to the non-always on circuit block 417 is still executed by the always on circuit block 415.

Figure 5:
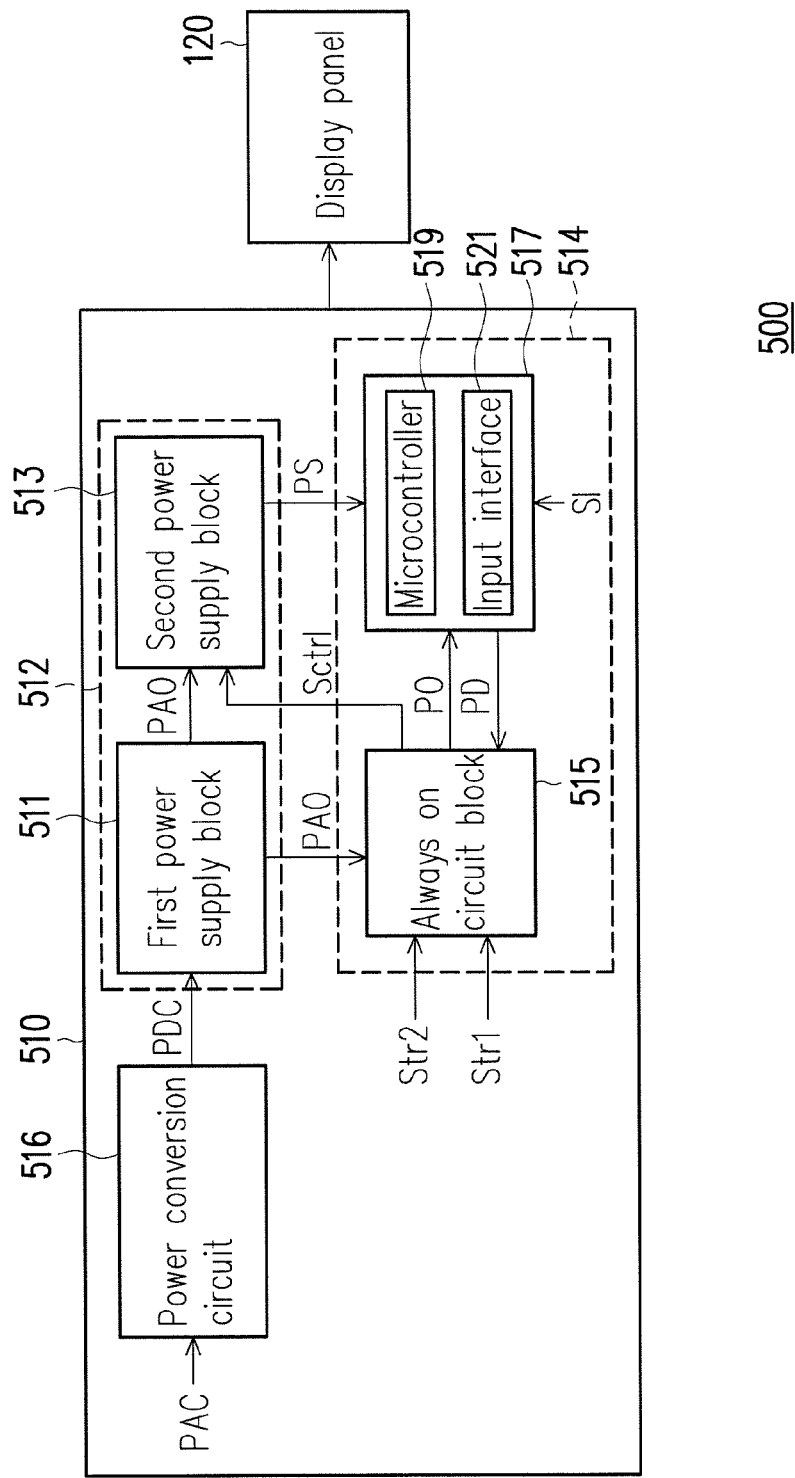
FIG. 5 is a schematic diagram of an image display system according to yet another embodiment of the disclosure.

In the embodiment of FIG. 1, the image processing apparatus 110 directly receives the DC voltage PDC, and the first power supply block 111 of the power supply unit 112 generates the first bias voltage PAO according to the DC voltage PDC, though the disclosure is not limited thereto. FIG. 5 is a schematic diagram of an image display system according to yet another embodiment of the disclosure. Referring to FIG. 5, an image processing apparatus 510 of the present embodiment further includes a power conversion circuit 516. The power conversion circuit 516 receives an alternating current (AC) voltage PAC, and converts the AC voltage PAC into a DC voltage PDC. In the present embodiment, the power conversion circuit 516 is, for example, a power module or an adaptor in a monitor system structure. It should be noticed that in other embodiments, the image processing apparatus 510 does not include the power conversion circuit therein, but is coupled to the power conversion circuit instead.

An embodiment is provided below to describe a different implementation of the internal circuit of the power supply unit of the disclosure.

Figure 6:
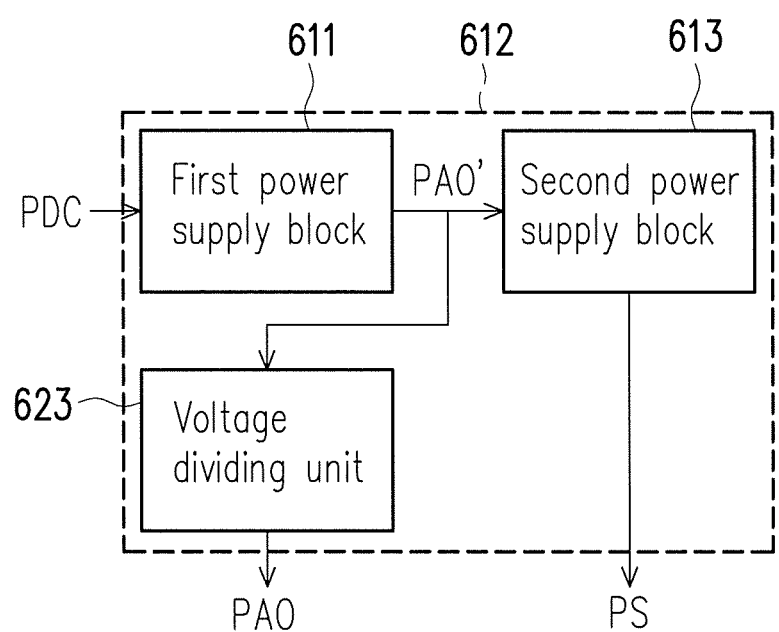
FIG. 6 is a schematic diagram of a power supply unit according to an embodiment of the disclosure.

FIG. 6 is a schematic diagram of a power supply unit according to an embodiment of the disclosure. Referring to FIG. 1 and FIG. 6, in the embodiment of FIG. 1, the power supply unit 112 includes the first power supply block 111, which is used for receiving the DC voltage PDC and generating the first bias voltage PAO according to the DC voltage PDC, and directly providing the first bias voltage PAO to the always on circuit block 115. In the present embodiment, the power supply unit 612 further includes a voltage dividing unit 623, which is configured to divide a third bias voltage PAO' to generate the first bias voltage PAO. In detail, the first power supply block 611 receives the DC voltage PDC, and generates the third bias voltage PAO' according to the DC voltage PDC. The second power supply block receives the third bias voltage PAO', and generates the second bias voltage PS according to the third bias voltage PAO'.

In summary, in an exemplary embodiment of the disclosure, one of the always on circuit block and the non-always on circuit block controls the power supply unit to stop supplying the bias voltage to the non-always on circuit block according to the event trigger signal, such that the non-always on circuit block enters an operation mode with lower power consumption from another operation mode. In the operation mode with lower power consumption, at least the microcontroller is powered down to achieve the power saving effect, for example, achieve system power consumption within 1 mW.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An image processing unit, comprising:
    an always on circuit block, configured to receive a first bias voltage from a power supply unit, wherein the first bias voltage serves as an operating voltage for the always on circuit block; and
    a non-always on circuit block, comprising a microcontroller of the image processing unit, wherein when the non-always on circuit block operates under a first operation mode, the non-always on circuit block receives a second bias voltage from the power supply unit served as an operating voltage for the non-always on circuit block, so as to perform an image processing operation on an image input signal, and when the non-always on circuit block operates under a second operation mode, the non-always on circuit block stops receiving the second bias voltage from the power supply unit, so as to stop the image processing operation, and at least the microcontroller of the non-always on circuit block is powered down;
    wherein the always on circuit block controls the power supply unit to start supplying the second bias voltage to the non-always on circuit block according a second event trigger signal, such that the non-always on circuit block enters the first operation mode from the second operation mode; and
    wherein one of the always on circuit block and the non-always on circuit block controls the power supply unit to stop supplying the second bias voltage to the non-always on circuit block according a first event trigger signal, such that the non-always on circuit block enters the second operation mode from the first operation mode.

2. The image processing unit as claimed in claim 1, wherein the always on circuit block outputs an operation stop signal to the non-always on circuit block according to the first event trigger signal, the non-always on circuit block outputs a power down signal to the always on circuit block according to the operation stop signal, the always on circuit block controls the power supply unit to stop supplying the second bias voltage to the non-always on circuit block according to the power down signal, such that the non-always on circuit block enters the second operation mode from the first operation mode.

3. The image processing unit as claimed in claim 2, wherein the microcontroller in the non-always on circuit block is configured to receive the operation stop signal.

4. The image processing unit as claimed in claim 1, wherein the always on circuit block outputs a power down signal to the power supply unit according to the first event trigger signal, the power supply unit stops supplying the second bias voltage to the non-always on circuit block according to the power down signal, such that the non-always on circuit block enters the second operation mode from the first operation mode.

5. The image processing unit as claimed in claim 1, wherein the non-always on circuit block further includes an input interface of the image processing unit.

6. An image processing apparatus, configured to drive a display panel, the image processing apparatus comprising:
    the power supply unit, configured to provide the first bias voltage and the second bias voltage; and
    the image processing unit as claimed in claim 1, coupled to the power supply unit.

7. The image processing apparatus as claimed in claim 6, wherein the power supply unit comprises a first power supply block and a second power supply block respectively providing the first bias voltage and the second bias voltage.

8. The image processing apparatus as claimed in claim 7, wherein
    the first power supply block is configured to receive a direct current (DC) voltage, and generates the first bias voltage according to the DC voltage, and
    the second power supply block is configured to receive the first bias voltage, and generates the second bias voltage according to the first bias voltage.

9. The image processing apparatus as claimed in claim 8, wherein the first bias voltage is smaller than the DC voltage, and the second bias voltage is smaller than the first bias voltage.

10. The image processing apparatus as claimed in claim 7, wherein
    the first power supply block is configured to receive a DC voltage, and generates a third bias voltage according to the DC voltage,
    the second power supply block is configured to receive the third bias voltage, and generates the second bias voltage according to the third bias voltage, and
    the power supply unit further comprises a voltage dividing unit configured to divide the third bias voltage to generate the first bias voltage.

11. The image processing apparatus as claimed in claim 8, further comprising:
    a power conversion circuit, configured to receive an alternating current (AC) voltage, and converting the AC voltage into the DC voltage.

12. An image display system, comprising:
    the image processing apparatus as claimed in claim 6; and
    a display panel, driven by the image processing apparatus to display an image.

13. The image display system as claimed in claim 12, further comprising:
    a power conversion circuit, configured to receive an alternating current (AC) voltage, and converting the AC voltage into a DC voltage for providing to the power supply unit in the image processing apparatus.

14. An image processing unit, comprising:
    an always on circuit block, configured to receive a first bias voltage from a power supply unit, wherein the first bias voltage serves as an operating voltage for the always on circuit block; and
    a non-always on circuit block, comprising a microcontroller of the image processing unit, wherein when the non-always on circuit block operates under a first operation mode, the non-always on circuit block receives a second bias voltage from the power supply unit served as an operating voltage for the non-always on circuit block, so as to perform an image processing operation on an image input signal, and when the non-always on circuit block operates under a second operation mode, the non-always on circuit block stops receiving the second bias voltage from the power supply unit, so as to stop the image processing operation, and at least the microcontroller in the non-always on circuit block is powered down;
    wherein the always on circuit block outputs an operation stop signal to the non-always on circuit block according to a first event trigger signal, the non-always on circuit block outputs a power down signal to the always on circuit block according to the operation stop signal, the always on circuit block controls the power supply unit to stop supplying the second bias voltage to the non-always on circuit block according to the power down signal, such that the non-always on circuit block enters the second operation mode from the first operation mode.

15. The image processing unit as claimed in claim 14, wherein the always on circuit block controls the power supply unit to start supplying the second bias voltage to the non-always on circuit block according to a second event trigger signal, such that the non-always on circuit block enters the first operation mode from the second operation mode.

16. An image processing unit, comprising:
an always on circuit block, configured to receive a first bias voltage from a power supply unit, wherein the first bias voltage serves as an operating voltage for the always on circuit block; and
a non-always on circuit block, comprising a microcontroller of the image processing unit, wherein when the non-always on circuit block operates under a first operation mode, the non-always on circuit block receives a second bias voltage from the power supply unit served as an operating voltage for the non-always on circuit block, so as to perform an image processing operation on an image input signal, and when the non-always on circuit block operates under a second operation mode, the non-always on circuit block stops receiving the second bias voltage from the power supply unit, so as to stop the image processing operation, and at least the microcontroller in the non-always on circuit block is powered down,
wherein the always on circuit block outputs a power down signal to the power supply unit according to a first event trigger signal, the power supply unit stops supplying the second bias voltage to the non-always on circuit block according to the power down signal, such that the non-always on circuit block enters the second operation mode from the first operation mode.

17. The image processing unit as claimed in claim 16, wherein the always on circuit block controls the power supply unit to start supplying the second bias voltage to the non-always on circuit block according to a second event trigger signal, such that the non-always on circuit block enters the first operation mode from the second operation mode.

\* \* \* \* \*